United States Patent [19]
Cromeens

[11] 3,951,189
[45] Apr. 20, 1976

[54] APPARATUS FOR INDEXING A CUTTING HEAD

[75] Inventor: Jeff Y. Cromeens, Mesquite, Tex.

[73] Assignee: Industrial Woodworking Machine Co., Inc., Garland, Tex.

[22] Filed: Oct. 15, 1974

[21] Appl. No.: 514,631

[52] U.S. Cl. .................................. 144/91; 144/3 C
[51] Int. Cl.² ......................................... B27F 1/16
[58] Field of Search ................. 144/2 R, 3 C, 90 R, 144/90 A, 91, 36, 37, 130, 117 B; 83/425.4

[56] References Cited
UNITED STATES PATENTS

| | | | |
|---|---|---|---|
| 3,179,135 | 4/1965 | Windsor | 144/91 X |
| 3,289,714 | 12/1966 | Hammer | 144/2 R |
| 3,527,274 | 9/1970 | Kramer | 144/91 |
| 3,538,968 | 11/1970 | Gluck | 144/2 R X |
| 3,554,247 | 1/1971 | Larsen | 144/117 B |

*Primary Examiner*—Al Lawrence Smith
*Assistant Examiner*—Gary L. Smith
*Attorney, Agent, or Firm*—Joseph H. Schley; Thomas L. Cantrell

[57] ABSTRACT

A cutting head for forming finger joints in the ends of successively presented boards moved into engagement therewith, is slidably mounted for vertical reciprocation between two preselected cutting positions. The movement is imparted by a pressure fluid actuator which is cyclically actuated to urge the cutting head alternately into the preselected positions after each cutting operation. The apparatus facilitates shaping consecutive work pieces respectively into left and right hand mating finger joints with a single cutting head, requiring no manual effort or set-up between pieces.

7 Claims, 7 Drawing Figures

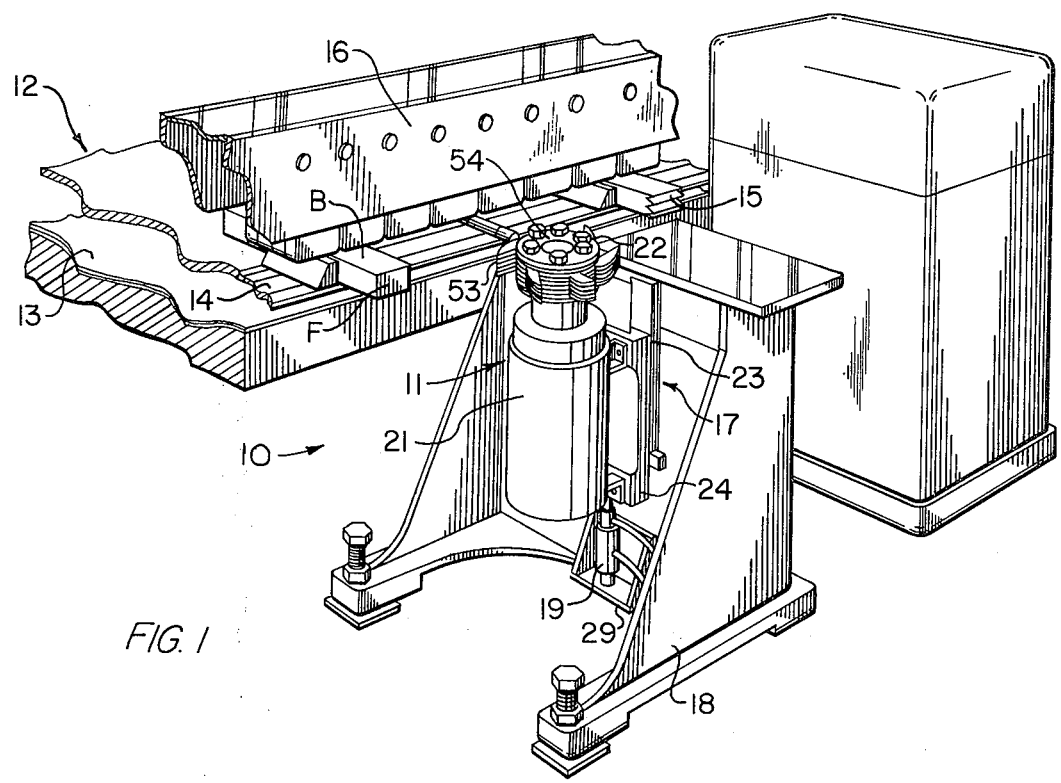
FIG. 1
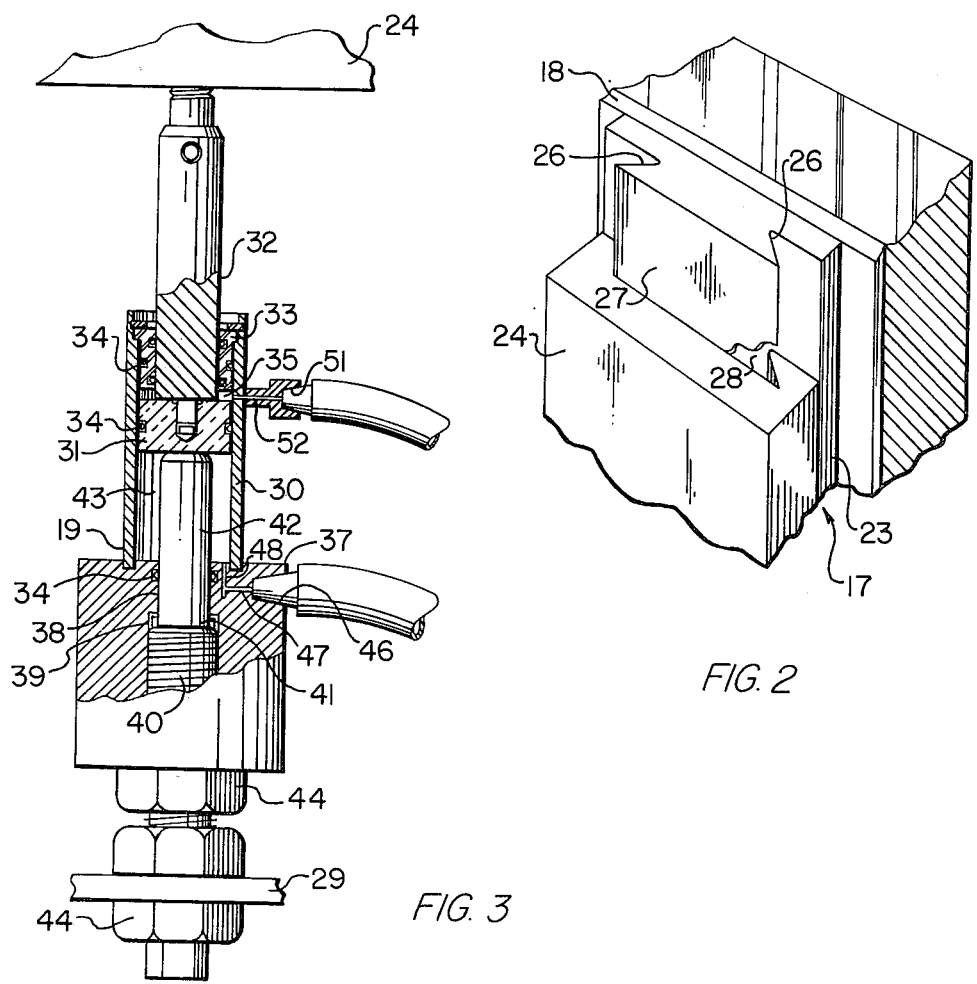
FIG. 2
FIG. 3

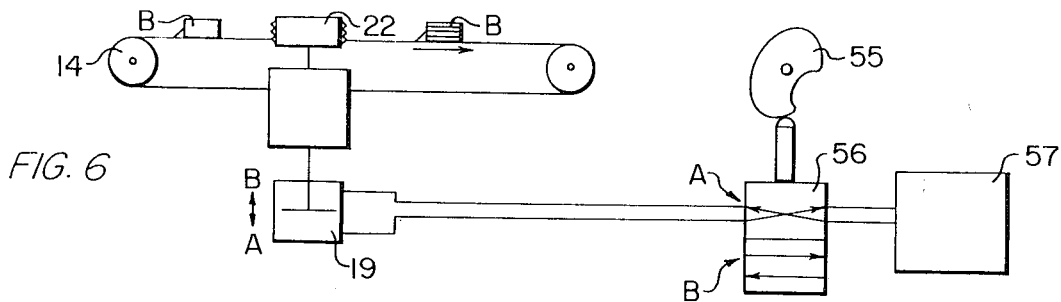
FIG. 6
| CUTTING HEAD POSITION | B A |
| VALVE POSITION | B A |
| BOARD ENGAGEMENT | IN OUT |
FIG. 7
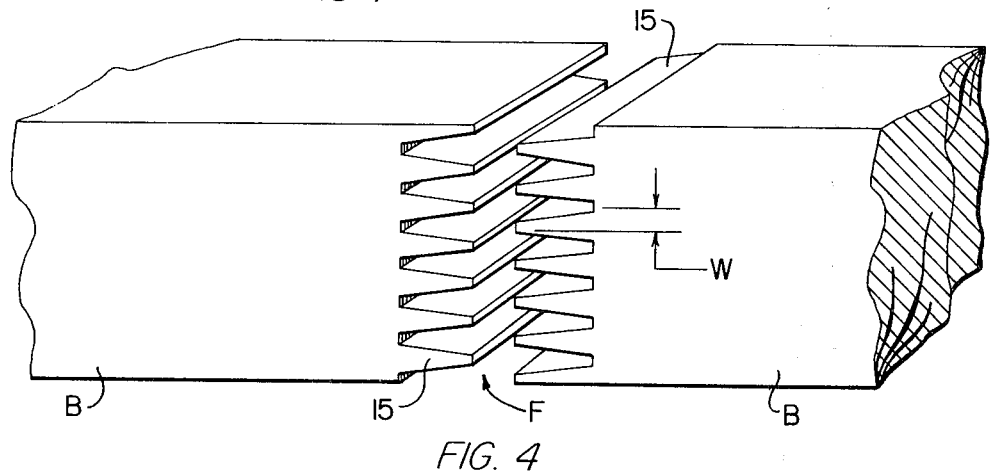
FIG. 4
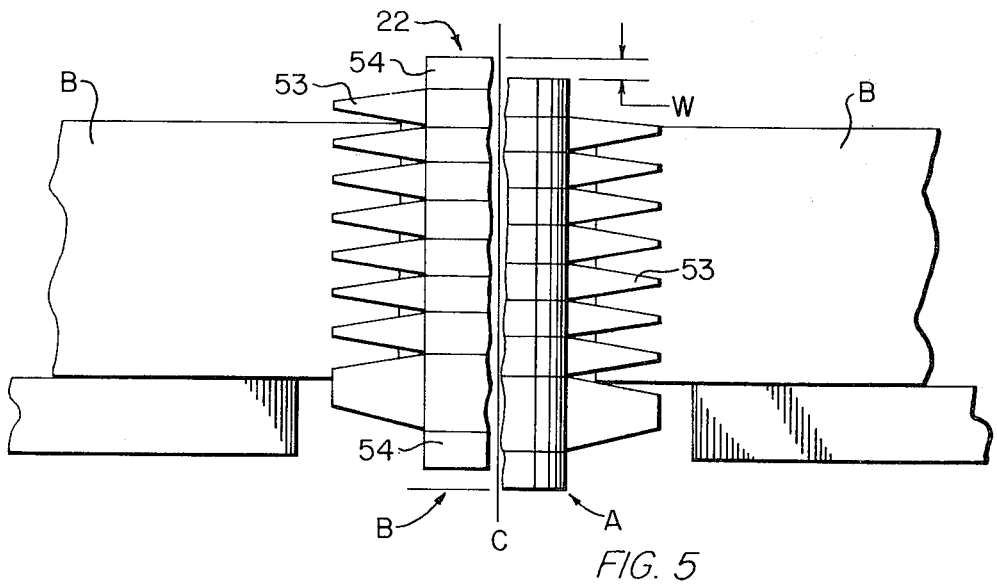
FIG. 5

APPARATUS FOR INDEXING A CUTTING HEAD

FIELD OF THE INVENTION

The present invention relates to woodworking apparatus for cutting finger joints in boards and, more particularly, to apparatus for cutting mating finger joints in consecutively shaped boards with a single cutting head.

DESCRIPTION OF THE PRIOR ART

Finger jointed lumber is produced by cutting the ends of boards or timbers in interengageable fashion for joining end to end to form a longer length of lumber. The cutting is generally performed in woodworking machines while the boards are held on their sides and conveyed transversely of their linear dimension, producing serrations in the vertical end surfaces thereof. Serrations in mating boards are offset so that pairs of boards may be interengaged to produce the finger jointed lumber.

The particular finger joint configuration formed is determined by the spacing and cutting edge configurations of a plurality of spaced rotary blades or knives in the cutting head. A single cutting head design is sometimes provided for each of the cutting heads used to shape mating finger joint configurations. A single head design is utilized by aligning the cutting heads to cut the left and right hand shapes with predetermined portions thereof. Generally, only a relatively small adjustment between the vertical position of the cutting heads in relation to the work pieces is necessary.

Certain finger joint configurations are designed to be reversible requiring only a single cutting head in the woodworking machine. By utilizing such a configuration, the shaped pieces are identically cut and one of each pair is turned over to become a mating piece for interengagement. This provides immediate pairing of work pieces but variations in material thickness become a problem. When an identically shaped piece is turned over the common reference surface is lost and the finger joint formed therebetween may be uneven on both sides. To alleviate this problem, dual cutting heads are commonly used for cutting the left hand and the right hand finger joint configurations. The vertical positions of the cutting heads are set in relation to the work pieces. In this manner the finger jointed material is cut from a common reference plane which enables the mating of varying thicknesses of nonuniform lumber. Although this method requires the complexity and expense of operating two cutting heads it is feasible for finger jointing standard lumber sizes.

Common in the woodworking industry is the creation of shorter than standard length lumber during various cutting and trimming operations. Such lumber is inherently nonuniform and often too small in size for conventional apparatus. Up to now, it has been uneconomically feasible to handle such lumber in lengths less than 8 inches in standard woodworking apparatus. It is therefore usually scrapped. Such scrap lumber, though otherwise capable of producing finger jointed lumber is usually not utilized since the cost of providing a separate cutting head mechanism for producing finger joints in scrap material makes such use unprofitable.

Heretofore apparatus has been unavailable which could cut both right hand and left hand finger joints in consecutive pieces of lumber using a single cutting head without manual effort or set-up between pieces. Such apparatus could meet the common reference surface requirements for the finger joint and yet be economically feasible for handling scrap material. The apparatus would also find application in cutting standard lengths of finger jointed boards. With the growing shortage of lumber in the world, the need has been fostered for making use of all finger joint material. The need for an apparatus to cut consecutively mating finger jointed boards with a single cutting head has thus been recognized.

SUMMARY OF THE INVENTION

One object of the present invention is to provide a new and improved apparatus for shaping finger jointed lumber.

Another object of the present invention is to provide a new and improved apparatus for cutting mating finger joints in consecutive pieces of lumber.

A further object of the present invention is to provide a new and improved apparatus for cutting mating finger joints in consecutive pieces of lumber with a single cutting head.

A further object of the present invention is to provide a new and improved apparatus for indexing a single cutting head to successive positions for cutting mating finger joints in the ends of consecutive pieces of lumber.

A new and improved apparatus for indexing a rotary cutting head into selected cutting positions for engagement with the ends of successively presented work pieces conveyed along a path includes a frame for supporting the cutting head in a position adjacent the path of the work pieces. An elongated guide means is mounted on the frame in parallel relation to the axis of rotation of the cutting head which is mounted for rectilinear movement thereon. Means for rotating the cutting head is provided with means for imparting reciprocating movement thereto between a pair of predetermined limits.

In accordance with one aspect of the invention, the apparatus is adapted to position a cutting head comprising a circularly mounted array of knives of predetermined length and shape, with respect to work pieces such as boards being conveyed transversely of the linear dimension of the separate pieces. Boards are fed singularly in parallel spaced relationship through predetermined interengagement with the cutting head to impart the desired finger joint shape in their ends. The cutting head is designed to cut mating finger joints in consecutive boards by the use of predetermined sections of the head. These cutting sections may overlap and require only a slight movement of the cutting head with respect to the work pieces. These cutting sections may also be entirely separate requiring a much greater movement.

In accordance with another aspect of the invention the means for rotating the cutting head is a drive motor axially coupled to the cutting head, therein comprising a cutting head assembly. The elongated guide means is capable of rigidly supporting the entire cutting head assembly in a preselected position of engagement with the ends of the boards. Comprising the guide means is a slide member engaged in slidable confinement with a base. The cutting head assembly is secured thereto whereby said assembly is slidably mounted in parallel relation to its vertical axis of rotation. This arrangement provides for the necessary lateral stability and rectilinear movement of the cutting head assembly for the successive index positions in the shaping operation.

Facilitating the rectilinear movement of the cutting head assembly upon the guide means between successive shaping operations is a pressure responsive actuating device.

The apparatus may be adjusted to receive various sizes of boards and may provide a wide range of finger joint configurations. Short pieces of lumber previously scrapped now may be provided with engageable finger joints and joined together to form usable stock lengths. The advantages of economy and efficiency facilitated by a single cutting head makes such an apparatus a most effective and efficient means of handling such material.

DESCRIPTION OF THE DRAWINGS

The objects and various features of the present invention will be understood from the following detailed description of a preferred embodiment thereof when read in conjunction with the accompanying drawings wherein:

FIG. 1 is a perspective view of an apparatus embodying the principles of the present invention;

FIG. 2 is an enlarged fragmentary perspective view of the apparatus of FIG. 1 illustrating the various details of an elongated guide means forming part of the invention;

FIG. 3 is an enlarged fragmentary, transverse, vertical sectional view of the apparatus of FIG. 1 illustrating the various details of a pressure fluid actuator forming part of the invention;

FIG. 4 is an illustration of mating finger jointed boards positioned in end to end engageable relationship;

FIG. 5 is a side elevational view of finger jointed boards and a cutting head representing the engagement of successively positioned boards with the cutting head in consecutive indexed positions.

FIG. 6 is a schematic representation of an indexing system showing a method of synchronization between the cutting head and the conveyor; and FIG. 7 is a graphical representation of the operation of the indexing system illustrated in FIG. 6.

DETAILED DESCRIPTION

Attention is first directed to FIG. 1 wherein an indexing or a jump head apparatus 10 is shown positioning a cutting head assembly 11 in operative relation to a woodworking apparatus 12 having a horizontal bed or table 13. Apparatus 12 is designed to form finger-joinable material from work pieces in the form of timbers or boards B which are successively positioned for shaping. The boards B are oriented on their sides or edges so that their ends, indicated as F, are carried past the cutting head assembly 11 across the table 13 by suitable conveyor apparatus 14 equipped with upstanding cleats or the like for maintaining proper orientation of the ends F to form fingers 15 therein. The boards B are conveyed between the table 13 and a pressure head 16 adapted for holding work pieces of different thickness against displacement for shaping. Preferably the pressure head 16 may be of the type described in pending application Ser. No. 451,451, filed Mar. 15, 1974.

The indexing or jump head apparatus 10 may be seen to include an elongated upright or vertical guide means 17 mounted upon a frame 18 and connected to an actuator 19. Upon the guide means 17, cutting head assembly 11 is mounted and is adapted to be indexed between two or more predetermined vertical positions.

In accordance with one embodiment of the present invention, the cutting head assembly 11 includes a drive motor 21 operably coupled to a cutting head 22 for imparting rotary shaping action thereto about an upright or vertical axis. As seen most clearly in FIG. 5, the upright axial length of the cutting head 22 is greater than the width of the end F of the board B. During the shaping action, the relative positions therebetween determine the portion of the cutting head 22 which will engage the ends F to form the desired shape therein. The position of the cutting head assembly 11 in relation to the path of the boards B must therefore be maintained during each shaping operation to produce the selected finger joint configuration.

Supporting the cutting head assembly 11 for upright vertical reciprocation between two axially or vertically spaced positions is the guide means 17, which, as seen most clearly in FIG. 2, includes an upright base 23 and a complementary slide block 24. The two are engaged in slidable confinement facilitating reciprocatory movement of the slide block 24 and preventing lateral movement thereof. The base 23 is suitably rigid in construction to support the cutting head assembly 11 and to provide precise alignment of the cutting head axis. Formed on opposite sides of one surface of the base 23 is a pair of spaced, parallel, longitudinal undercut grooves 26 defining a central dovetail portion 27. A mating longitudinal dovetail recess 28 is formed in the slide block 24 for receiving and engaging the dovetail portion 27 of the base. Cutting head assembly 11 is fixedly mounted on the slide block 24 providing the cutting head 22 with the capability of rectilinear motion and axial stability.

As shown in FIGS. 1 and 3, the actuator 19 is a pressure responsive actuating device mounted on a support plate 29 secured to the frame 18, coupled to the slide block 24, and operable by a suitable pressure fluid, for example, compressed air, or oil, to reciprocate said slide block 24 and the cutting head assembly 11 between first and second vertical shaping positions for selective engagement with the ends F. A conventional pressure fluid supply system, represented schematically in FIG. 6 and discussed in more detail below, provides the pressurized fluid to operate actuator 19 cyclically and urge the cutting head assembly 11 into preselected positions after each cutting operation.

As shown most clearly in FIG. 3, the actuator 19 comprises a cylindrical barrel or cylinder 30 having a piston 31 slidably mounted coaxially therein. A connecting rod 32 fixed to the piston 31 upstands coaxially therefrom and haas its upper end threaded into a suitably tapped bore in the lower end of the slide block 24. A guide sleeve positioned in the upper portion of the cylinder 30 forms an upper cylinder head 33 having an axial bore complementary to the connecting rod 32 which extends therethrough.

Sealing means in the form of O-rings 34 are provided for containing pressure fluid introduced into an upper chamber 35 of cylinder 30, defined between the piston 31 and the upper cylinder head 33. The O-rings 34 are interposed between the connecting rod 32 and the upper cylinder head, between said upper cylinder head and the cylinder 30, and between the piston 31 and said cylinder 30, to prevent leakage of the pressure fluid.

The lower end of the cylinder 30 is connected to a cylindrical base 37 forming a lower cylinder head having a bore 38 and a coaxial counterbore 39. The counterbore 39 is tapped for adjustably receiving an enlarged threaded portion 40 of an elongated upright rod 41. A reduced upper portion or extension 42 of the rod 41 projects into a lower chamber 43 defined between the piston 31 and base 37. Suitable nuts 44 are threaded on the lower end of the rod 41, against the base 37 and on opposite sides of support plate 29 for securing said rod to said plate and providing for adjustments in the elevation of the cutting head assembly 11. Rod extension 42 acts as a lower end stop in the chamber 43 to limit the stroke of the piston, and the upper cylinder head 33 serves as an upper end stop in the upper chamber 34. The spacing of the stops defines the stroke of the piston 31 and rod 32 and is adjustable through positioning of the rod 41 relative to the base 37. The spacing illustrated is for a relatively short stroke, but may be adjusted for a stroke of several inches. An O-ring 34 in the bore 38 provides a fluid tight seal around the rod 41 preventing the escape of pressure fluid introduced into the chamber 43.

In operation, pressure fluid is introduced into the lower chamber 43 through an orifice 46 which communicates with the chamber 43 through restricted passageways 47 and 48 in the base 37. The pressure in the chamber 43 creates a pressure differential across piston 31 urging it and the slide block 24 upwardly until said piston engaged the upper cylinder head 33. Cutting head assembly 11 travels a vertical distance equal to the stroke of piston 31. This stroke is adjusted to coincide with positioning of the cutting head 22 in relation to the ends F. Any fluid in the upper chamber 34 is forced out of an orifice 51 through a restricted passageway 52 in the cylinder 30.

The piston 31 is adapted to be moved downwardly until it engages the lower end stop defined by the extension 42 of the rod 41 by reversing the direction of the operating fluid. The pressure fluid actuating system thus provides capability of selective indexing of the cutting head 22.

The configuration of the fingers 15 in the end F is determined by the position of the cutting head 22 in relation to board B. To provide this shaping action the cutting head 22 comprises a plurality of knives 53 circularly arranged around a cutting head frame 54. The position and shape of each pair of knives 53 determines the position and shape of each finger 15 shaped in the end F. It can be seen from FIG. 5 that the knives 53 penetrate a predetermined distance into the board B to form this shape.

The cutting head assembly 11, as described herein, has the drive motor 21 directly coupled thereto. This arrangement facilitates the rigid vertical alignment and controlled rotational runout tolerances necessary for the shaping operations. Obviously, the cutting head assembly may include the cutting head and any suitable means for imparting the necessary rotational torque thereto other than the drive motor.

Attention is now directed to FIGS. 4 and 5 where the configurations of mating finger joint material may best be seen. In FIG. 4 mating finger joined boards B are shown in end-to-end engageable alignment. The shapes of complete fingers 15 in boards B are identical and a distance W represents the spacing between the center lines of mating fingers 15. It is thus seen in FIG. 5 that indexing cutting head 22 this distance W provides for shaping these mating configurations. The cutting head representation to the left and to the right of the center line C illustrates the shaping of first and second boards B, respectively. FIG. 5 is an illustrative representation of the indexing of the cutting head 22 and consecutive boards are preferably conveyed along the same path and cut along the same reference side as shown in FIG. 1. This manner of operation provides for shaping consecutive boards B from a common reference plane, facilitating their assembly into finger jointed lumber.

In operation, the boards B are placed upon the infeed portion of the conveyor 14 in parallel spaced relationship, and the end F of each board is conveyed past the cutting head 22 for engagement therewith. The speed of the conveyor 14 is synchronized with the operation of the actuator 19 to provide the necessary time for the jump head apparatus 10 to reposition the cutting head assembly 11 before engaging the next end F.

Synchronization of the actuator 19 may be provided through a conventional cam or solenoid operated valve system acting in conjunction with the pressure fluid supply system. Such a system is schematically represented in FIG. 6, wherein a plate cam 55 is synchronously driven in relation to the speed of conveyor 14. Cam 55 is coupled to a four-way valve 56 controlling and directing the flow of pressure fluid from a fluid supply 57 to the actuator 19, therein imparting the desired movement of the piston 31.

In illustration of this form of operation, FIG. 7 shows the relationship between the cutting head, the valve 56, and successively engaged boards. In position "A" pressure fluid is introduced into the upper chamber 35 and released from the lower chamber 43, causing the cutting head assembly 11 to index from its uppermost position to its lowermost position, indicated by the letter A in FIG. 5. In position "B" the correspondingly opposite action occurs. The timed feeding of consecutively shaped boards is illustrated in FIG. 7 showing the time each successively presented board is engaged by the cutting head assembly 11. Between successive shaping operation, the valve 56 actuates the jump head apparatus 10 for proper indexing of the cutting head assembly 11, alleviating the requirement for manual effort or set-up between consecutive work pieces.

It is believed that the operation and construction of the above described invention will be apparent from the foregoing description. While the particular embodiment of the jump head apparatus shown and described has been characterized as being preferred, it will be obvious that various changes and modifications may be made therein without departing from the spirit and scope of the invention as defined in the following claims.

What is claimed is:

1. An apparatus for indexing a rotary cutting head into selected cutting positions for engagement with the ends of successively presented work pieces conveyed along a path, comprising:

a support frame for positioning the cutting head adjacent the path of the work pieces;

elongated guide means mounted on the support frame;

means for slidably mounting the cutting head for rectilinear movement on the elongated guide means in parallel relation to the axis of rotation of the cutting head;

actuator means positioned to engage the slidable mounting means and impart reciprocal rectilinear movement to the cutting head between predetermined limits in opposite directions subsequent to each cutting operation; and means for operating the actuator means in synchronism with the conveyance of successive work pieces.

2. An apparatus as defined in claim 1 wherein said elongated guide means and slidable mounting means comprises:
a base member having parallel undercut grooves longitudinally formed therein; and
a slide member adapted for engaging said grooves in slidable confinement.

3. An apparatus as defined in claim 1 wherein said actuator means comprises:
a cylinder having upper and lower portions;
a sleeve positioned in the upper cylinder portion;
a piston slidably mounted coaxially within the lower cylinder portion;
a piston rod secured to and upstanding coaxially from the piston and extending through the sleeve for coupling to the cutting head; and
an elongated rod extending through said lower cylinder portion and projecting into said cylinder;
said actuator means being operated by a pressure fluid creating a pressure differential across the piston and imparting movement thereto, which movement is limited by the relative positions between said sleeve and elongated rod.

4. An apparatus as defined in claim 1 wherein said actuator means is pressure responsive;
the means for operating said actuator means including pressure fluid supply means.

5. An apparatus for indexing a rotary cutting head into selected cutting positions for engagement with the ends of successively presented work pieces conveyed along a path, comprising:
a support frame for positioning the cutting head adjacent the path of the work pieces;
elongated guide means mounted on the frame;
means slidably for mounting the cutting head for rectilinear movement on the elongated guide means in parallel relation to the axis of rotation of the cutting head;
actuator means positioned to engage the slidable mounting means and impart reciprocal rectilinear movement to the cutting head between predetermined limits in opposite directions subsequent to each cutting operation;
said actuator means including
a cylinder having upper and lower portions,
a sleeve positioned in the upper cylinder portion,
a piston slidably mounted coaxially within the lower cylinder portion,
a piston rod secured to and upstanding coaxially from the piston and extending through the sleeve for coupling to the cutting head,
an elongated rod extending through the lower cylinder portion and projecting upwardly into said cylinder;
pressure fluid supply means communicating with said upper and lower cylinder portions for operating said actuator means by creating a pressure differential across said piston and imparting reciprocal movement thereto subsequent to each cutting operation, which movement is limited by the relative positions between said sleeve and elongated rod; and means cyclically coupling the pressure fluid supply means to said actuator means in synchronism with the conveyance of work pieces.

6. In a finger joint shaping machine of the kind conveying and positioning boards before a cutting head for forming the ends thereof into interengageable configurations, an apparatus for indexing a rotary cutting head adapted to shape interengageable configurations in consecutive boards by engaging the boards with selected portions of the cutting head which comprises:
a support frame for secure positioning of the cutting head adjacent the conveyance of the boards by the machine;
a base adapted for secure positioning upon said frame and having upright parallel undercut grooves forming a central dovetail portion therein;
a slide member having a mating dovetail recess formed therein for engaging said base central dovetail portion in slidable confinement to reciprocate thereon in a manner providing lateral stability;
means mounting the cutting head upon said slide member with the cutting head axis of rotation parallel to the reciprocation of the slide member
an actuating device comprising a pressure fluid cylinder and a piston slidably mounted therein and biased by the introduction of a pressure fluid to impart rectilinear movement to said slide member for positioning the cutting head; and
pressure fluid supply means and means cyclically coupling said supply to said actuating device in synchronism with the conveyance of successive work pieces.

7. An improved woodworking apparatus of the type including a cutting head having a plurality of axially spaced, parallel, rotary cutting knives, conveyor means for carrying pre-oriented work pieces past said cutting head in cutting relationship to the knives thereof and means for driving said cutting knives to form a plurality of spaced notches in each successive work piece to define a plurality of fingers thereon, wherein the improvement comprises:
means for successively indexing said cutting head axially between first and second predetermined positions; and
means for actuating the indexing means subsequent to each cutting operation whereby mating fingers are formed in every successively presented pair of work pieces;
said means for successively indexing said cutting head axially between first and second predetermined positions including
a support frame,
elongated guide means mounted on the support frame,
means mounting said cutting head for rectilinear movement on the elongated guide means;
actuator means coupled to said cutting head for imparting rectilinear movement thereto into the selected indexed positions,
the actuator means being operated by pressure fluid supply means, and
means cyclically operatively coupling the pressure fluid supply means to said actuator means in synchronism with the conveyance of successive work pieces.

* * * * *